United States Patent

Mims

[15] 3,673,245

[45] June 27, 1972

[54] TREATMENT OF OFF-GASES FROM NITRIC ACID OXIDATION OF ANOLONE

[72] Inventor: Samuel S. Mims, Odessa, Tex.

[73] Assignee: El Paso Products Company, Odessa, Tex.

[22] Filed: Sept. 3, 1969

[21] Appl. No.: 855,013

[52] U.S. Cl. ...................................260/531 R, 260/537 P
[51] Int. Cl. ..............................................C07c 51/18
[58] Field of Search ..............................260/531 R

[56] References Cited

UNITED STATES PATENTS 2,557,282  6/1951  Hamblet et al. ..............260/531 R X
3,365,490  1/1968  Arthur et al. .....................260/531 R

FOREIGN PATENTS OR APPLICATIONS 567,525  2/1945  Great Britain ................260/531 R Primary Examiner—Lorraine A. Weinberger
Assistant Examiner—Richard D. Kelly
Attorney—McCarthy, Depaoli & O'Brien

[57] ABSTRACT

Off-gases, obtained from the nitric acid oxidation of an organic feed comprising cyclohexanol and cyclohexanone and mixtures thereof by contact in a reactor with nitric acid at an elevated temperature whereby adipic acid is produced, the mixture of off-gases comprising nitric oxide, nitrogen dioxide, other oxides of nitrogen, carbon dioxide, nitrogen and carbon monoxide, are mixed with an oxygen-containing gas and the resultant mixture is passed through the organic feed being passed to the nitric acid reactor. This results in utilizing all reactive oxidizing agents in the off-gases and transferring a portion of the highly exothermic reaction from the main reactor to the off-gas scrubber.

11 Claims, No Drawings

TREATMENT OF OFF-GASES FROM NITRIC ACID OXIDATION OF ANOLONE

BACKGROUND OF THE INVENTION

1. Field of the Invention

This invention relates to a process for the treatment of the off-gases resulting from the nitric acid oxidation of cyclohexanol and cyclohexanone for maximum utilization thereof.

Adipic acid is produced in large quantities by the nitric acid oxidation of cyclohexanol, cyclohexanone and mixtures thereof, the mixture commonly called "anolone." In practicing the reaction, the mixture is introduced, together with from two to six times as much nitric acid, calculated as 100 percent nitric acid, into a well-mixed and cooled reactor. The nitric acid is fed as an aqueous solution of about 40–60 percent strength and copper, vanadium or other metal catalyst values are dissolved in the nitric acid feed in order to improve the reaction efficiency. The reaction is generally carried out at temperatures between about 60° and 90° C. A second stage reactor operating at a higher temperature, 90°–120° C., is generally employed to complete the reaction. The residence time in each reaction stage is about 10 minutes to an hour. The reaction mixture resulting from these steps is then cooled in order to crystallize out the adipic acid. This general process, as outlined, is described with many variations in various patents and publications. Illustrative of processes of this type are U.S. Pat. Nos. 2,439,513, 2,557,282, 2,831,024, and 2,844,626.

During the course of this oxidation reaction however, large amounts of gases are evolved from the reaction mixture. These gases comprise nitrous oxide ($N_2O$), carbon dioxide, nitric oxide (NO), nitrogen dioxide ($NO_2$), nitrogen and a small amount of carbon monoxide. The exact composition and amounts of this gaseous mixture depends on the composition and purity of the organic feed used in the oxidation as well as on other reaction conditions, such as, for example, temperature, nitric acid strength and the type and amount of catalyst used.

The nitrous oxide, carbon dioxide, nitrogen and carbon monoxide are relatively inert compounds, and as far as the adipic acid process is concerned, are usually considered as waste materials. On the other hand, the nitric oxide (NO), nitrogen dioxide ($NO_2$) and higher oxides of nitrogen derived from these, such as $N_2O_3$, $N_2O_4$, etc. are reactive oxidizing agents valuable for reuse in the nitric acid oxidation reaction.

Usually these reactive oxides of nitrogen are recovered by well known techniques such as by absorption in water or in nitric acid. A quantity of air, or other oxygen-containing gas, sufficient to convert the nitric oxide to nitrogen dioxide is generally mixed with the off-gases prior to the absorption process. The air or other gas is preferably introduced by blowing through the reaction mixture, thus assisting in displacing the reaction gases from the liquid reaction mixture.

In conventional processes, the off-gases, after mixing with the injected air or oxygen containing gas, are then compressed and passed through an absorption tower where they are contacted with water or dilute nitric acid. In this procedure, the nitrogen dioxide is absorbed and forms nitric acid. The nitric acid so formed is dilute and must be concentrated prior to recycle to the nitric acid oxidation reaction. These conventional processes, as well as the basic process, are illustrated for example in prior mentioned U.S. Pat. Nos. 2,439,513 and 2,557,282.

With respect to the other prior art mentioned as relating to this process, U.S. Pat. Nos. 2,831,024 and 2,844,626 describe processes for the production of adipic acid which eliminate the off-gas absorption steps outlined above altogether. In these processes, the reaction is carried out under a partial pressure of oxygen and the off-gases remain in contact with the reaction mixture until the reaction is completed. Economies in usage of nitric acid are claimed as being advantages of these processes. In addition, U.S. Pat. No. 2,298,387 describes the oxidation of cyclohexanol, cyclohexanone and other compounds with nitrogen dioxide with no nitric acid being used in the process. In this patent, the NO or $N_2O_3$ formed during the reaction are said to be readily converted to nitrogen dioxide by treatment with air and reemployed for further oxidation.

It is accordingly clear that a need remains in the art for procedures by which the off-gases from the nitric acid oxidation of anolone, which contain valuable components, can be processed as a part of the nitric acid reaction so as to conserve economies of the process and increase capacities of the existing nitric acid oxidation plants.

SUMMARY OF THE INVENTION

It is accordingly one object of this invention to provide a procedure wherein the off-gases resulting from the nitric acid oxidation of anolone are processed to maximize the recovery and usage of the valuable components contained therein.

A further object of the invention is to provide a process by which the off-gases resulting from the nitric acid oxidation of cyclohexanol, cyclohexanone and mixtures thereof can be processed so as to utilize the oxidizable components contained therein in existing nitric acid oxidation plants.

Other objects and advantages of the present invention will become apparent as the description thereof proceeds.

In satisfaction of the foregoing objects and advantages there is provided by the present invention an improved process for the nitric acid oxidation of a feed comprising cyclohexanol, cyclohexanone and mixtures thereof wherein the organic feed is contacted in a nitric acid reactor with nitric acid of about 40 to 60 percent strength at a temperature of about 60°–150° C. to produce adipic acid and a gaseous mixture is produced comprising nitrous oxide, nitric oxide, nitrogen dioxide, higher oxides of nitrogen, carbon dioxide, nitrogen and carbon monoxide, the improvement comprising admixing the gaseous mixture with an oxygen-containing gas and passing the resultant mixture through the organic feed being passed to the nitric acid reactor.

DESCRIPTION OF PREFERRED EMBODIMENTS

As indicated above, the process of this invention is concerned with treatment of the off-gases resulting from the nitric acid oxidation of cyclohexanol, cyclohexanone, and/or mixtures of these two oxidizable components, commonly called anolone, in the production of adipic acid. In this nitric acid oxidation process the anolone mixture is introduced with from two to six times as much nitric acid, calculated as 100 percent nitric acid, into a well mixed and cooled reactor, the nitric acid being fed as an aqueous solution of about 40 to 60 percent strength. In the reaction, copper, vanadium or other metal catalyst values are preferably dissolved in the nitric acid being fed to the reactor in order to improve reaction efficiency. The reaction is carried out at temperatures between 60° and 90° C. in a first stage with a second stage reactor generally operating at a higher temperature of about 90° to 120° C. in order to complete the reaction. The residence time in each reaction stage is about 10 minutes to 1 hour. The finished reaction mixture is then cooled in order to crystallize out the adipic acid.

During this reaction the gases evolved from the reaction mixture comprise nitrous oxide, carbon dioxide, nitric oxide, nitrogen dioxide, nitrogen and a small amount of carbon monoxide with the exact composition of the off-gases and amounts being dependent on the composition and purity of the organic feed to the oxidation as well as on other reaction conditions such as temperature, nitric acid strength and type and amount of catalyst used.

According to the process of this invention the prior art steps for absorptive treatment or disposal of these off-gases, as outlined hereinbefore, are eliminated. By the present process, improved results are achieved by passing the off-gas mixture, after mixing with an oxygen-containing gas, through the organic feed which is being fed to the nitric acid reactors. During this procedure, the materials in the gases which are reactive oxidizing agents, mainly nitric oxide and nitrogen dioxide, react with the cyclohexanol/cyclohexanone mixture to effect further oxidation and are effectively removed from the off-gas mixture and reaction.

In addition to simplifying the overall nitric acid oxidation process, treatment of the off-gases according to this invention has the further advantage of transferring a portion of the highly exothermic reaction from the primary nitric acid reactors into the off-gas scrubber. When operating at high rates of production, heat removal from the primary reactors is frequently a problem. Also, the process provides procedures for maximizing the oxidation efficiency of the process by utilizing all components to their maximum extent in oxidizing the feedstock. In addition, in practicing the process, nitric oxide or nitrogen dioxide from other sources may be added to the off-gas mixture prior to passage through the scrubber. This will serve to decrease still further the heat release of the primary nitric acid reactor.

In practicing the process of this invention, anolone prepared by the air-oxidation of cyclohexane, a well known art reaction, is fed to the nitric acid oxidation reactor operating under the reaction conditions outlined above. This feedstock will generally comprise a major amount of cyclohexanol, a lesser amount of cyclohexanone and minor amounts of lighter and heavier ends. As the reaction proceeds in its initial stages, off-gases are produced having the general composition outlined above. This mixture of off-gases is then fed to a scrubber for contact with organic feedstock being passed to the nitric acid reactor, the feedstock also being fed through the scrubber.

In the scrubber, which is of the conventional type, a liquid level of the organic feedstock is maintained and the off-gas mixture is bubbled therethrough. The off-gas mixture is preferably admixed with a stream of oxygen-containing gas, such as air, or pure oxygen, prior to introduction into the scrubber. Alternatively, the off-gas mixture may be introduced directly into the scrubber with the oxygen-containing gas being introduced directly into the scrubber. The scrubber is operated generally at about room temperature or preferably at temperatures ranging from about 25° C. up to 75° C.

In the scrubber, the oxidizing components of the off-gas, mainly nitrogen dioxide, reacts with the anolone mixture and is effectively removed from the off-gas mixture. This of course has the effect of lowering the amount of nitric acid ultimately required for oxidation of the anolone feedstock by almost complete utilization of the oxidizing nitrogen compounds contained in the off-gases.

From the scrubber, on conclusion of the reaction, the remaining relatively inert gases are vented as the spent off-gas and sent to further off-gas recovery procedures or treated as waste. Overflow from the scrubber reaction is then fed to the nitric acid reactor for completion of the oxidation reaction with nitric acid as discussed above.

As is to be seen, the process of the invention results in maximum utilization of the valuable components contained in the off-gases in maximizing the oxidation reaction by conducting a portion of the oxidation reaction in the scrubber zone. This results in decreasing the amount of nitric acid ultimately required to effect the oxidation and also decreases the exothermic heat release in the primary nitric acid reactor. Therefore the process of the invention provides a number of advantages over prior known processes.

While the process has been described with respect to conducting the process by a batch operation, it is obvious that the process particularly lends itself to continuous operation. Thus once the nitric acid oxidation operation is initiated, the off-gases may be removed and continuously passed through the anolone feed as it passes through the scrubber prior to entering the main reactor. Hence, optimum results are achieved in continuous operation.

The following examples are given to illustrate the reaction of the invention but it is not to be considered as limited thereto.

EXAMPLE I

In this experiment, the oxidation product used as the organic feedstock, and as obtained from an air oxidation of cyclohexane, was of the following composition:

TABLE I

Cyclohexane Oxidation Product

| | |
|---|---|
| Light Ends | 1.1% |
| Cyclohexanone | 34.6% |
| Cyclohexanol | 64.0% |
| Heavy Ends | 0.3% |

In a first experiment, a mixture of this composition was fed continuously to a stirred and cooled reactor. Simultaneously nitric acid (53.27 percent), containing dissolved copper and vanadium, was fed to the same reactor. The reactor was maintained at a temperature of 86° C. and a stream of nitrogen was passed through the liquid. Overflow from the reactor, which held 600 milliliters, passed to a second similar stirred and heated reactor maintained at 99° C. The reaction product was collected as overflow from this second reactor.

EXAMPLE II

In a second experiment a mixture having the composition given in Table I above was fed to a scrubber. The gaseous mixture leaving the reactors operating as in Example I, also was fed to the scrubber where it was bubbled through about 60 milliliters of the organic feed. Overflow from the scrubber was fed to the two-state reaction system described in Example I. The same nitric acid solution described in Example I was fed to the first reactor. A mixture of air and oxygen was also fed to the first reactor. Other conditions were as described in Example I.

The operating conditions and results of Examples I and II are summarized in Table II for comparison purposes as follows:

TABLE II

| | Example I (No Scrubber) | Example II (Scrubber) |
|---|---|---|
| Organic feed rate, g./min. | 2.63 | 2.64 |
| Nitric acid feed rate, g./min. (100% HNO$_3$) | 5.87 | 5.83 |
| Nitrogen feed rate, cc./min. | 100 | 0 |
| Air feed rate, cc./min. | 0 | 200 |
| Oxygen feed rate, cc./min. | 0 | 200 |
| Nitrogen in off-gas, cc./min. | 143 | 187 |
| Oxygen in off-gas, cc./min. | ND | 95 |
| Carbon dioxide in off-gas, cc./min. | 153 | 156 |
| Nitrous oxide in off-gas, cc./min. | 600 | 600 |
| Carbon monoxide in off-gas, cc./min. | 2 | 2 |
| Nitric oxide in off-gas, cc./min. | 122 | ND |
| Nitrogen dioxide in off-gas, visual | Present | Absent |
| Nitric acid in reaction product, g./min.(100% HNO$_3$) | 2.79 | 3.12 |
| Loss of nitric acid per gram of organic feed, g. | 1.17 | 1.03 |
| Calculated amount of nitric acid recoverable from nitric oxide in off-gas per gram of organic feed, g. | 0.13 | 0 |

In comparing the results of Examples I and II, it is to be seen that Example II, operating by the procedure of the invention, results in substantially complete removal of nitric oxide and nitrogen dioxide from the off-gases, results in smaller loss of nitric acid per gram of organic feed and prevents loss of recoverable nitric acid from nitric oxide in the off-gas.

EXAMPLE III

In this experiment off-gas from the experiment in Example II was passed for a measured time through a solution of 10 percent aqueous hydrogen peroxide. This converted the nitric oxide and the nitrogen dioxide to nitric acid. Titration of the resulting solution gave the amount of recoverable nitric acid in the off-gas. Results of measurements made on the off-gas prior to and after passing through the scrubber are presented in Table III. These show the effectiveness in nitric acid recovery of scrubbing the off-gases with the organic feed.

TABLE III

Nitric Acid Recovery

|  | Recovered Nitric Acid Per Gram of Organic Feed, Grams |
|---|---|
| From Off-gas Before Scrubber | 0.120 |
| From Off-gas After Scrubber | 0.013 |

The invention has been described herein with reference to certain preferred embodiments. However, the invention is not to be considered as limited thereto.

What is claimed is:

1. In a process for the nitric acid oxidation of an organic feed consisting essentially of cyclohexanol, cyclohexanone and mixtures thereof by contact with aqueous nitric acid at an elevated temperature in a nitric acid reactor wherein adipic acid is produced and wherein an off-gas mixture comprising nitric oxide, nitrogen dioxide, other oxides of nitrogen, carbon dioxide, nitrogen and carbon monoxide is produced, the improvement which comprises admixing the off-gas mixture with an oxygen-containing gas and reacting the resulting mixture with the organic feed prior to passage to the nitric acid reactor.

2. A process according to claim 1 wherein about two to six parts of nitric acid are employed in the reaction per part of organic feed.

3. A process according to claim 2 wherein the temperature of the nitric acid reactor is maintained between 60° and 120° C.

4. The process according to claim 3 wherein the nitric acid is of about 40 to 60 percent strength.

5. A process according to claim 4 wherein a metal catalyst consisting essentially of copper or vanadium is maintained in the nitric acid reactor.

6. A process according to claim 5 wherein two nitric acid reactors are employed, the first maintained at a temperature of about 60°–90° C. and the second at a temperature of about 90° to 120° C.

7. A process according to claim 6 wherein the off-gas mixture and organic feed are admixed in a scrubber at a temperature of about 25° to 75° C.

8. A process according to claim 7 wherein the organic feed is maintained as a liquid in the scrubber while the off-gas mixture is passed therethrough.

9. A process according to claim 8 wherein the off-gas mixture is bubbled through the organic feed while in the scrubber.

10. A process according to claim 9 wherein the organic feed, after contact in the scrubber with the off-gas mixture, is passed to the nitric acid reactor, and spent off-gases are vented from the scrubber.

11. A process according to claim 1 wherein the oxygen-containing gas is air or oxygen.

* * * * *